(12) United States Patent
Tumulty, II et al.

(10) Patent No.: US 11,093,784 B2
(45) Date of Patent: Aug. 17, 2021

(54) SYSTEM FOR LOCATING, INTERPRETING AND EXTRACTING DATA FROM DOCUMENTS

(71) Applicant: Rapid Financial Services, LLC, Bethesda, MD (US)

(72) Inventors: William Joseph Tumulty, II, Davidsonville, MD (US); Bogdan Aurel Nastea, Beltsville, MD (US)

(73) Assignee: Rapid Financial Services, LLC, Bethesda, MD (US)

( * ) Notice: Subject to any disclaimer, the term of this patent is extended or adjusted under 35 U.S.C. 154(b) by 124 days.

(21) Appl. No.: 16/184,578

(22) Filed: Nov. 8, 2018

(65) Prior Publication Data

US 2020/0151491 A1    May 14, 2020

(51) Int. Cl.
*G06K 9/62* (2006.01)
*G06K 9/00* (2006.01)
*G06K 9/46* (2006.01)
*G06F 16/93* (2019.01)

(52) U.S. Cl.
CPC ............... *G06K 9/46* (2013.01); *G06F 16/93* (2019.01); *G06K 9/6201* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 5,434,933 A | * | 7/1995 | Karnin | G06K 9/2054 382/192 |
| 7,149,347 B1 | * | 12/2006 | Wnek | G06K 9/00469 382/159 |
| 8,255,330 B2 | | 8/2012 | Cameo et al. | |
| 8,606,714 B1 | | 12/2013 | Cameo et al. | |
| 8,762,277 B1 | | 6/2014 | Cameo et al. | |
| 2001/0042083 A1 | * | 11/2001 | Saito | G06K 9/00442 715/202 |
| 2009/0092320 A1 | * | 4/2009 | Berard | G06K 9/00442 382/209 |
| 2010/0254615 A1 | * | 10/2010 | Kantor | G06K 9/6201 382/218 |
| 2011/0128360 A1 | * | 6/2011 | Hatzav | G06K 9/00469 348/61 |
| 2014/0344128 A1 | | 11/2014 | Nikankin et al. | |
| 2015/0030241 A1 | * | 1/2015 | Kakkar | G06K 9/00483 382/165 |
| 2018/0025222 A1 | * | 1/2018 | Yellapragada | G06K 9/00469 382/176 |
| 2018/0032804 A1 | * | 2/2018 | Yellapragada | G06K 9/00483 |

* cited by examiner

*Primary Examiner* — Bernard Krasnic
(74) *Attorney, Agent, or Firm* — Honigman LLP

(57) ABSTRACT

Methods, systems and computer-readable media for extracting data from a document. One method includes receiving a document in a text format and assigning a first signature to the document. The method also includes matching the first signature to a second signature of a template and extracting data a user desires to have extracted from the document, wherein instructions for locating the data are stored within the template.

8 Claims, 13 Drawing Sheets

BANK
Bank
P O BOX 12345
City, ST 67890

November 01, 2018 through November 30, 2018
Account Number: 000000123456789

CUSTOMER SERVICE INFORMATION

| | |
|---|---|
| Web site: | Bank.com |
| Service Center: | 1-800-123-3456 |
| Deaf and Hard of Hearing: | 1-800-123-4444 |
| Para Español: | 1-888-123-5555 |
| International Calls: | 1-800-123-6666 |

Joe Smith
777 South Street
City, ST 22345

CHECKING SUMMARY

| | INSTANCES | AMOUNT |
|---|---|---|
| Beginning Balance | | $1,000.00 |
| Deposit and Additions | 2 | $200.00 |
| Checks Paid | 1 | -$150.00 |
| ATM & Debit Card Withdrawals | 1 | -$20.00 |
| Fees | 0 | $0.00 |
| Ending Balance | | $1,030.00 |

| | |
|---|---|
| Month | November |
| Year | 2018 |
| Account Number | 00000123456789 |
| Customer Name | Joe Smith |
| Name of Bank | Bank |
| Starting Balance for Month | $1,000.00 |
| Ending Balance | $1,030.00 |
| Total Deposits in Dollars | $200.00 |
| Total Number of Deposits | 2 |

Exact word "November"; page 1; line 1; word 1;
Exact word "03"; page 1; line 1; word 2;
Exact word "2018"; page 1; line 1; word 3;
Exact word "through"; page 1; line 1; word 4 from right;
Exact word "November"; page 1; line 1; word 4;
Exact word "30"; page 1; line 1; word 5;
Exact word "2018"; page 1; line 1; word 6;
Exact word "Bank"; page 1; line 2; word 1;
Exact word "Account"; page 1; line 2; word 2;
Exact word "Number"; page 1; line 2; word 3;
Exact word "000000123456789"; page 1; line 2; word 4;
Exact word "P"; page 1; line 3; word 1;
Exact word "O"; page 1; line 3; word 2;
Exact word "Box"; page 1; line 3; word 3;
Exact word "12345"; page 1; line 3; word 4;
Exact word "City"; page 1; line 4; word 1;
Exact word "ST"; page 1; line 4; word 2;
Exact word "67890"; page 1; line 4; word 3;
Exact word "CUSTOMER"; page 1; line 5; word 3 from right;
Exact word "CUSTOMER"; page 1; line 5; word 1;
Exact word "SERVICE"; page 1; line 5; word 2 from right;
Exact word "SERVICE"; page 1; line 5; word 2;
Exact word "INFORMATION"; page 1; line 5; word 1 from right;
Exact word "INFORMATION"; page 1; line 5; word 3;
Exact word "Web"; page 1; line 6; word 2 from right;
Exact word "Web"; page 1; line 6; word 1;
Exact word "site"; page 1; line 6; word 1 from right;
Exact word "site"; page 1; line 6; word 2;
Exact word "Service"; page 1; line 7; word 3 from right;
Exact word "Service"; page 1; line 7; word 1;
Exact word "Center"; page 1; line 7; word 2 from right;
Exact word "Center"; page 1; line 7; word 2;
Exact word "Deaf"; page 1; line 8; word 6 from right;
Exact word "and"; page 1; line 8; word 5 from right;
Exact word "Hard"; page 1; line 8; word 4 from right;
Exact word "of"; page 1; line 8; word 3 from right;
Exact word "Hearing"; page 1; line 8; word 2 from right;
Exact word "1-800-123-4444"; page 1; line 8; word 1 from right;
Exact word "Para"; page 1; line 9; word 3 from right;
Exact word "Española"; page 1; line 9; word 2 from right;
Exact word "1-888-123-5555"; page 1; line 9; word 1 from right;

Exact word "International"; page 1; line 10; word 3 from right;
Exact word "Calls"; page 1; line 10; word 2 from right;
Exact word "1-800-1234-6666"; page 1; line 10; word 1 from right;
Exact word "Joe"; page 1; line 11; word 1;
Exact word "Smith"; page 1; line 11; word 2;
Exact word "777"; page 1; line 12; word 1;
Exact word "Street"; page 1; line 12; word 2;
Exact word "City"; page 1; line 12; word 3;
Exact word "ST"; page 1; line 13; word 1;
Exact word "12345"; page 1; line 13; word 2;
Exact word "Checking"; page 1; line 14; word 1;
Exact word "Summary"; page 1; line 14; word 2;
Exact word "Instances"; page 1; line 15; word 1;
Exact word "Amount"; page 1; line 15; word 2;
Exact word "Beginning"; page 1; line 16; word 1;
Exact word "Balance"; page 1; line 16; word 2;
Exact word "$1,000.00"; page 1; line 16; word 3;
Exact word "Deposits"; page 1; line 17; word 1;
Exact word "and"; page 1; line 17; word 2;
Exact word "Additions"; page 1; line 17; word 3;
Exact word "2"; page 1; line 17; word 4;
Exact word "$200.00"; page 1; line 17; word 5;
Exact word "Checks"; page 1; line 18; word 1;
Exact word "Paid"; page 1; line 18; word 2;
Exact word "1"; page 1; line 18; word 3;
Exact word "-$150.00"; page 1; line 18; word 4;
Exact word "ATM"; page 1; line 19; word 1;
Exact word "8"; page 1; line 19; word 2;
Exact word "Debit"; page 1; line 19; word 3;
Exact word "Card"; page 1; line 19; word 4;
Exact word "Withdrawals"; page 1; line 19; word 5;
Exact word "1"; page 1; line 19; word 6;
Exact word "-$20.00"; page 1; line 19; word 7;
Exact word "Fees"; page 1; line 20; word 1;
Exact word "0"; page 1; line 20; word 2;
Exact word "$00.00"; page 1; line 20; word 3;
Exact word "Ending"; page 1; line 21; word 1;
Exact word "Balance"; page 1; line 21; word 2;
Exact word "$1,030.00"; page 1; line 21; word 3;
1 word(s) to the right from word "through" found: page 1; line 1; word 4;

FIG. 2E

| Month | January |
| Year | 2019 |
| Account Number | 0900009876543321 |
| Customer Name | John Carter |
| Name of Bank | Bank |
| Starting Balance for Month | $10,000.00 |
| Ending Balance | $8,000.00 |
| Total Deposits in Dollars | $2,000.00 |
| Total Number of Deposits | 10 |

Exact word "January"; page 1; line 1; word 1;
Exact word "01"; page 1; line 1; word 2;
Exact word "2019"; page 1; line 1; word 3;
Exact word "through"; page 1; line 1; word 4 from right;
Exact word "January"; page 1; line 1; word 5;
Exact word "31"; page 1; line 1; word 6;
Exact word "2019"; page 1; line 1; word 7;
Exact word "Bank,"; page 1; line 2; word 1;
Exact word "Account"; page 1; line 2; word 2;
Exact word "Number"; page 1; line 2; word 3;
Exact word "9988009987654321"; page 1; line 2; word 4;
Exact word "P"; page 1; line 3; word 1;
Exact word "O"; page 1; line 3; word 2;
Exact word "Box"; page 1; line 3; word 3;
Exact word "12345"; page 1; line 3; word 4;
Exact word "City"; page 1; line 4; word 1;
Exact word "ST"; page 1; line 4; word 2;
Exact word "67890"; page 1; line 4; word 3;
Exact word "CUSTOMER"; page 1; line 5; word 3 from right;
Exact word "CUSTOMER"; page 1; line 5; word 1;
Exact word "SERVICE"; page 1; line 5; word 2 from right;
Exact word "SERVICE"; page 1; line 5; word 2;
Exact word "INFORMATION"; page 1; line 5; word 1 from right;
Exact word "INFORMATION"; page 1; line 5; word 3;
Exact word "Web"; page 1; line 6; word 3 from right;
Exact word "Web"; page 1; line 6; word 1;
Exact word "site:"; page 1; line 6; word 2 from right;
Exact word "site:"; page 1; line 6; word 2;
Exact word "Service"; page 1; line 7; word 3 from right;
Exact word "Service"; page 1; line 7; word 1;
Exact word "Center:"; page 1; line 7; word 2 from right;
Exact word "Center:"; page 1; line 7; word 2;
Exact word "Dear"; page 1; line 8; word 6 from right;
Exact word "and"; page 1; line 8; word 5 from right;
Exact word "Hard"; page 1; line 8; word 4 from right;
Exact word "of"; page 1; line 8; word 3 from right;
Exact word "Hearing:"; page 1; line 8; word 2 from right;
Exact word "1-800-123-4444"; page 1; line 8; word 1 from right;
Exact word "Para"; page 1; line 9; word 3 from right;
Exact word "Española:"; page 1; line 9; word 2 from right;
Exact word "1-888-123-5555"; page 1; line 9; word 1 from right;

Exact word "International"; page 1; line 10; word 3 from right;
Exact word "Calls"; page 1; line 10; word 2 from right;
Exact word "1-800-1234-6666"; page 1; line 10; word 1 from right;
Exact word "John"; page 1; line 11; word 1;
Exact word "Carter"; page 1; line 11; word 2;
Exact word "888"; page 1; line 12; word 1;
Exact word "North"; page 1; line 12; word 2;
Exact word "Ave."; page 1; line 12; word 3;
Exact word "Town"; page 1; line 13; word 1;
Exact word "MY"; page 1; line 13; word 2;
Exact word "48356"; page 1; line 13; word 3;
Exact word "Checking"; page 1; line 14; word 1;
Exact word "Summary"; page 1; line 14; word 2;
Exact word "Instance"; page 1; line 15; word 1;
Exact word "Amount"; page 1; line 15; word 2;
Exact word "Beginning"; page 1; line 16; word 1;
Exact word "Balance"; page 1; line 16; word 2;
Exact word "$10,000.00"; page 1; line 16; word 3;
Exact word "Deposit"; page 1; line 17; word 1;
Exact word "and"; page 1; line 17; word 2;
Exact word "Additions"; page 1; line 17; word 3;
Exact word "$10"; page 1; line 17; word 4;
Exact word "$2,000.00"; page 1; line 17; word 5;
Exact word "Checks"; page 1; line 18; word 1;
Exact word "Paid"; page 1; line 18; word 2;
Exact word "$"; page 1; line 18; word 3;
Exact word "-$3,000.00"; page 1; line 18; word 4;
Exact word "ATM"; page 1; line 19; word 1;
Exact word "&"; page 1; line 19; word 2;
Exact word "Debit"; page 1; line 19; word 3;
Exact word "card"; page 1; line 19; word 4;
Exact word "Withdrawals"; page 1; line 19; word 5;
Exact word "*"; page 1; line 19; word 6;
Exact word "-$1,000.00"; page 1; line 19; word 7;
Exact word "Fee"; page 1; line 20; word 1;
Exact word "*"; page 1; line 20; word 2;
Exact word "$60.00"; page 1; line 20; word 3;
Exact word "Ending"; page 1; line 21; word 1;
Exact word "Balance"; page 1; line 21; word 2;
Exact word "$8,000.00"; page 1; line 21; word 3;
1 word(s) to the right from word "through" found: page 1; line 1; word 4;

Exact word "through"; page 1; line 1; word 4 from right;
Exact word "through"; page 1; line 1; word 4;
Exact word "Bank,"; page 1; line 2; word 1;
Exact word "P"; page 1; line 3; word 1;
Exact word "O"; page 1; line 3; word 2;
Exact word "Box"; page 1; line 3; word 3;
Exact word "12345"; page 1; line 3; word 4;
Exact word "City"; page 1; line 4; word 1;
Exact word "ST"; page 1; line 4; word 2;
Exact word "67890"; page 1; line 4; word 3;
Exact word "CUSTOMER"; page 1; line 5; word 3 from right;
Exact word "CUSTOMER"; page 1; line 5; word 1;
Exact word "SERVICE"; page 1; line 5; word 2 from right;
Exact word "SERVICE"; page 1; line 5; word 2;
Exact word "INFORMATION"; page 1; line 5; word 1 from right;
Exact word "INFORMATION"; page 1; line 5; word 3;
Exact word "Web"; page 1; line 5; word 3 from right;
Exact word "Web"; page 1; line 6; word 1;
Exact word "site:"; page 1; line 6; word 2 from right;
Exact word "site:"; page 1; line 6; word 2;
Exact word "Service"; page 1; line 7; word 3 from right;
Exact word "Service"; page 1; line 7; word 1;
Exact word "Center:"; page 1; line 7; word 2 from right;
Exact word "Center:"; page 1; line 7; word 2;
Exact word "Deaf"; page 1; line 8; word 6 from right;
Exact word "and"; page 1; line 8; word 5 from right;
Exact word "Hard"; page 1; line 8; word 4 from right;
Exact word "of"; page 1; line 8; word 3 from right;
Exact word "Hearing:"; page 1; line 8; word 2 from right;
Exact word "1-800-123-4444"; page 1; line 8; word 1 from right;
Exact word "Para"; page 1; line 9; word 3 from right;
Exact word "Española"; page 1; line 9; word 2 from right;
Exact word "1-888-123-5555"; page 1; line 9; word 1 from right;
Exact word "international"; page 1; line 10; word 3 from right;
Exact word "Calls:"; page 1; line 10; word 2 from right;
Exact word "1-800-1234-6666"; page 1; line 10; word 1 from right;
Exact word "Checking"; page 1; line 14; word 1;
Exact word "Summary"; page 1; line 14; word 2;
Exact word "instances"; page 1; line 15; word 1;
Exact word "Amount"; page 1; line 15; word 2;
Exact word "Beginning"; page 1; line 16; word 1;
Exact word "Balance"; page 1; line 16; word 2;
Exact word "Deposit"; page 1; line 17; word 1;
Exact word "and"; page 1; line 17; word 2;
Exact word "Additions"; page 1; line 17; word 3;
Exact word "checks"; page 1; line 18; word 1;
Exact word "Paid"; page 1; line 18; word 2;
Exact word "ATM"; page 1; line 19; word 1;
Exact word "&"; page 1; line 19; word 2;
Exact word "Debt"; page 1; line 19; word 3;
Exact word "card"; page 1; line 19; word 4;
Exact word "Withdrawals"; page 1; line 19; word 5;
Exact word "Fees"; page 1; line 20; word 1;
Exact word "Ending"; page 1; line 21; word 1;
Exact word "Balance"; page 1; line 21; word 2;

204 →

205 →

Month
page 1; line 1; word 3 from right;
page 1; line 1; word 5;
1 word(s) to the right from word "through" found: page 1; line 1; word 4 from right;
1 word(s) to the right from word "through" found: page 1; line 1; word 4;
Year
page 1; line 1; word 1 from right;
page 1; line 1; word 7;
page 1 from bottom, line 1; word 1 from right;
3 word(s) to the right from word "through" found: page 1; line 1; word 4 from right;
3 word(s) to the right from word "through" found: page 1; line 1; word 4;
AccountNumber
2 word(s) to the right from word "Account" found: word 3 from right;
1 word(s) to the right from word "Number" found: word 2 from right;
CustomerName
page 1; line 11; word 1;
page 1; line 11; word 2;
NameOfBank
page 1; line 2; word 1;
StartingBalanceForMonth
2 word(s) to the right from word "Beginning" found: word 3 from right;
2 word(s) to the right from word "Beginning" found: word 1;
1 word(s) to the right from word "Balance" found: word 2 from right;
1 word(s) to the right from word "Balance" found: word 2;
EndingBalance
2 word(s) to the right from word "Ending" found: word 3 from right;
2 word(s) to the right from word "Ending" found: word 1;
1 word(s) to the right from word "Balance" found: word 2 from right;
1 word(s) to the right from word "Balance" found: word 2;
TotalDepositsInDollars
4 word(s) to the right from word "Deposits" found: word 5 from right;
4 word(s) to the right from word "Deposits" found: word 1;
3 word(s) to the right from word "and" found: word 4 from right;
3 word(s) to the right from word "and" found: word 2;
2 word(s) to the right from word "Additions" found: word 3 from right;
2 word(s) to the right from word "Additions" found: word 2;
TotalNumberOfDeposits
3 word(s) to the right from word "Deposits" found: word 5 from right;
3 word(s) to the right from word "Deposits" found: word 1;
2 word(s) to the right from word "and" found: word 4 from right;
2 word(s) to the right from word "and" found: word 2;
1 word(s) to the right from word "Additions" found: word 3 from right;
1 word(s) to the right from word "Additions" found: word 3;

FIG. 2I

SYSTEM FOR LOCATING, INTERPRETING AND EXTRACTING DATA FROM DOCUMENTS

TECHNICAL FIELD

This disclosure relates to systems, methods and computer readable media for extracting data from documents.

BACKGROUND

Methods and systems for extracting data from documents utilizing optical character recognition (OCR) based solutions are known, however these solutions can be slow, expensive and manually burdensome. Typically, these OCR based solutions require a user to manually define a template, which includes highlighting on a sample document image the location of data the user desires to have extracted. The user is required to manually create every template which is a time consuming endeavor. Therefore, a need still remains for a solution that is capable of extracting important information from documents in a way that is fast, accurate and cost effective.

SUMMARY

One aspect of the disclosure provides a method for creating a template for extracting data from a document. The method includes receiving, at a document input module, a first sample list. The first sample list includes a first document and a first set of data. The first set of data having indicia a user desires to have extracted from the first document. The method also includes assigning, by a locating module, a first signature to the first document and a location for every indicia included in the first set of data. The method further includes receiving, at the document input module, a second sample list. The second sample list includes a second document and a second set of data. The second set of data having indicia the user desires to have extracted from the second document. The method also includes assigning, by the locating module, a second signature to the second document and a location for every indicia included in the second set of data. The method further includes, determining, by a training module, similarities between the first signature and the second signature and similarities between the first set of data and the second set of data. The method also includes generating, by a template module, a template upon the occurrence of similarities between the first signature and the second signature, and similarities between the first set of data and the second set of data.

Implementations of the disclosure may include one or more of the following optional features. In some implementations, the indicia are words or numbers. In some examples, the first sample list and the second sample list are in a text format. In some configurations, the locating module determines the location of the indicia that comprise the first signature, the second signature, the first set of data and the second set of data by means of absolute or relative positioning.

In some implementations, the first signature includes a location for every indicia within the first document and the second signature includes a location for every indicia within the second document. In some examples, at least one location is provided for each indicia that comprises the first signature, the second signature, the first set of data and the second set of data. In some configurations, the first set of data and the second set of data includes only the indicia the user desires to have extracted. Optical character recognition (OCR) is not utilized to determine the location of the indicia that comprise the first signature, the second signature, the first set of data and second set of data.

In some examples, the template includes a third signature and a third set of data. The third signature includes only the similarities between the first signature and the second signature, and the third set of data includes only the similarities between the first set of data and the second set of data.

Another aspect of the disclosure provides a method for extracting data from a document. The method includes receiving, at a document input module, a document in a text format. The document contains a set of data that a user desires to have extracted. The method also includes, assigning, by a locating module, a first signature to the document and matching, by a training module, the first signature to a second signature of a template. The template includes a location for every indicia included in the set of data. The method further includes locating, by a locating module, every indicia included in the set of data in the document and extracting, by an extraction module, every indicia included in the set of data from the document.

Implementations of this aspect of the disclosure may include one or more of the following optional features. In some configurations, the indicia are words or numbers and the first signature includes a location for every indicia within the document. In some examples, every indicia included in the second signature is existing in the first signature and the second signature has less indicia than the first signature. In some implementations, the locating module determines the location of the indicia that comprise the first signature and the set of data by means of absolute or relative positioning and optical character recognition (OCR) is not utilized to determine the location of the indicia that comprise the first signature and the set of data.

Another aspect of the disclosure provides a non-transitory computer-readable medium having stored thereon computer-executable instructions that when executed by at least one processor of a computer cause the computer to perform certain steps. In some implementations, the steps include receiving, at a document input module, a document in text format and assigning, by a locating module, a first signature to the document. In some examples, the steps include matching, by a training module, the first signature to a second signature of a template and extracting, by an extraction module, data a user desires to have extracted from the document, wherein instructions for locating the data are stored within the template.

Implementations of this aspect of the disclosure may include one or more of the following optional features. In some implementations, the data includes only the words and numbers the user desires to have extracted.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 2C is an example first document that may be inputted into the system of FIG. 1.

FIG. 2D is an example set of data that may be inputted into the system of FIG. 1, the example set of data including data a user desires to have extracted from the first document shown in FIG. 2C.

FIG. 2E is an example signature assigned to the first document depicted in FIG. 2C.

FIG. 2G is an example set of data that may be inputted into the system of FIG. 1, the example set of data including data a user desires to have extracted from the second document shown in FIG. 2F.

FIG. 2H is an example signature assigned to the second document depicted in FIG. 2F.

FIG. 2I is an example template generated upon receiving and processing the first example document and the second example document.

Like reference symbols in the various drawings indicate like elements.

DETAILED DESCRIPTION

Generally, machine learning is the process of implementing statistical techniques to provide computers with the ability to learn without being manually programmed. The computer may be provided with one or more training data sets for building an initial model and/or one or more feedback datasets for adjusting the model. Machine learning may be implemented for predicting future events or outcomes using one or more of the models built based on historical occurrences or patterns. In the context of the instant disclosure, machine learning may be used to create templates that contain information such as the methods to locate and extract desired data from documents. The templates are created based upon the sample lists initially provided by a user, the sample lists include a sample document and data desired to be extracted from the sample document.

In the present disclosure data can be any information in digital form that can be transmitted or processed. Data may include any indicia such as characters, symbols, words or numbers. Additionally, a document can be in a written, photographic, electronic or other form.

Figure 1:
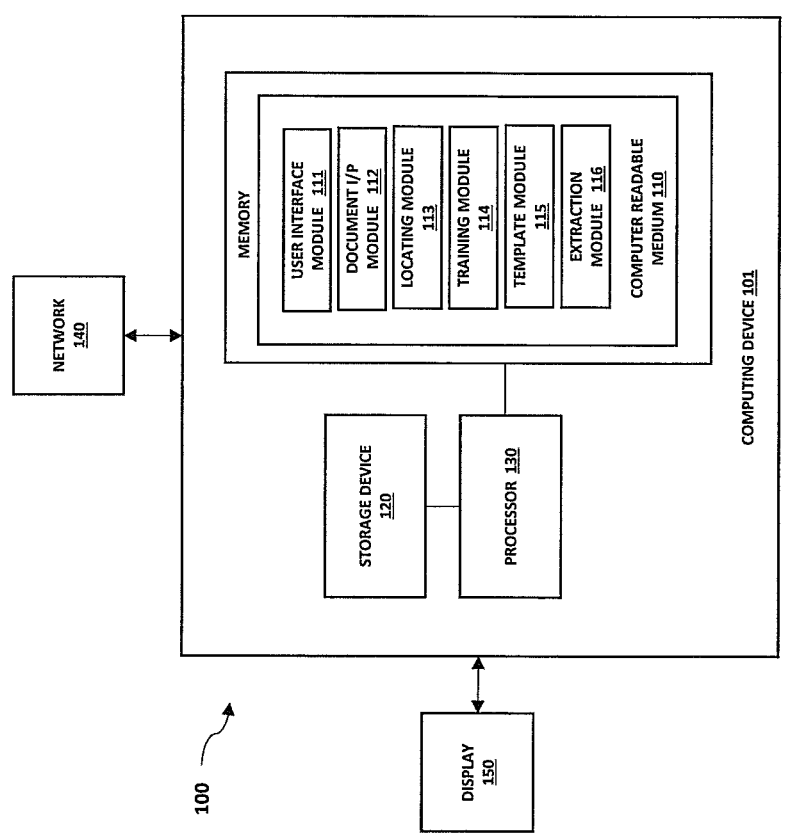
FIG. 1 is a schematic depiction of an example system for locating, interpreting and extracting data from documents.

Referring to FIG. 1, an example system 100 for locating, interpreting and extracting data from documents is illustrated. The system 100 includes a computing device 101 having a processor 130, a storage device 120 and a computer-readable medium 110. In some examples, the computing device 101 is communicatively coupled to a display 150 and a network 140. The processor 130, computer-readable medium 110 and storage device 120 may be connected via a bus. Further, in some implementations, the computing device 101 may include multiple processors 130 and multiple computer-readable medium modules 110.

In some configurations, the processor 130 retrieves and executes instructions stored in the computer-readable medium 110 and the storage device 120 stores associated data. The instructions stored in the computer-readable medium 110 include certain modules configured to perform particular functions when executed by the processor 130.

The network 140 may be one or more of a wireless network, a wired network, or any combination of a wireless network and a wired network. For example, the network 140 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal. Additionally or alternatively, the network 140 may include, without limitation, telephone lines, fiber optics, IEEE Ethernet 902.3, a wide area network (WAN), a local area network (LAN) or a global network such as the Internet. Also, network 140 may support an Internet network, a wireless communication network, a cellular network, or the like, or any combination thereof. Network 140 may further include one network, or any number of example types of networks mentioned above, operating as a stand-alone network or in cooperation with each other. Network 140 may utilize one or more protocols of one or more network elements to which they are communicatively couples. The network 140 may translate to or from other protocols to one or more protocols of network devices. Although the network 140 is depicted as a single network, it should be appreciated that the network 140 may comprise a plurality of interconnected networks, such as, for example, the Internet, a service provider's network, a cable television network, corporate networks, and home networks.

In some implementations, the computer-readable medium 110 includes a user interface module 111, a document input module 112, a locating module 113, a training module 114, a template module 115 and an extraction module 116.

In some configurations, machine learning is utilized in order to automate and improve the efficiency of the template creation process, in lieu of a user having to manually define and create a template. Machine learning may include, for example, supervised learning, unsupervised learning, semi-supervised learning, transduction, reinforcement learning, and other learning algorithms. For example, machine learning algorithms may include AODE, artificial neural networking, Bayesian algorithms, case-based reasoning, decision tree algorithms, Gaussian process regression, regression analysis, fuzzy algorithms, and/or a customized machine learning algorithm including aspects of any machine learning algorithm.

In one embodiment, a template is generated by a machine learning process, whereby a user initially provides a first sample list and a second sample list for building an initial algorithm or model. Subsequent sample lists may be provided by the user in order to adjust and improve the model, ultimately making the model more efficient. In some configurations, a template includes information such as the details pertaining to the data a user desires to have extracted from succeeding documents and the methods to locate and extract the desired data from the succeeding documents. The user is essentially inputting training samples into the system in order to create the templates. The more training samples inputted into the system by the user, the more efficient the methods within the templates for locating and extracting the desired data will be. The system automates the template creation process.

Figure 2A:
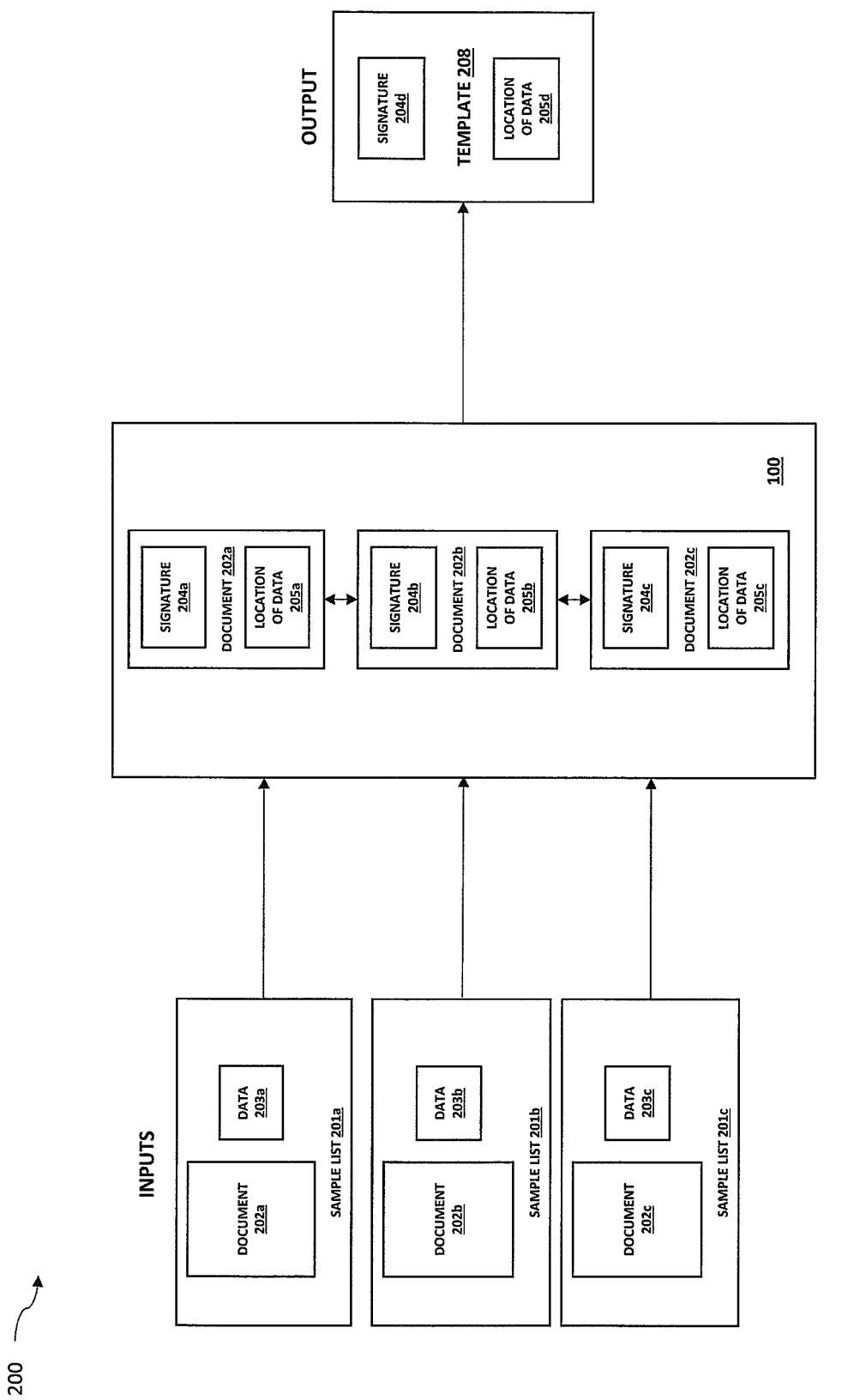
FIG. 2A is a schematic depiction of an example template generation method.

In another embodiment, depicted in FIG. 2A, a template is generated by a user inputting a first sample list 201a, a second sample list 201b and a third sample list 201c into a system 100. In some configurations, the first sample list 201a includes a first document 202a and a first set of data 203a the user desires to have extracted from the first document 202a. The second sample list 201b includes a second document 202b and a second set of data 203b the user desires to have extracted from the second document 202b. The third sample list 201c includes a third document 202c and a third set of data 203c the user desires to have extracted from the third document 201c.

In some examples, subsequent the sample lists 201 being inputted into the system 100, the system 100 assigns a first signature 204a to the first document 202a, a second signature 204b to the second document 202b and a third signature 204c to the third document 202c. Additionally, the system 100 determines a first location 205a for the first set of data 203a within the first document 202a, a second location 205b for the second set of data 203b within the second document 202b and a third location 205c for the third set of data 203c within the third document 202c.

Next, in some implementations, the system 100 analyzes and compares the first signature 204a, the second signature 204b and the third signature 204c. Also, the system 100 analyzes and compares the first location 205a of the first set of data 203a, the second location 205b of the second set of data 203b and the third location 205c of the third set of data 203c.

Upon the occurrence of similarities discovered between the first signature 204a, the second signature 204b, the third signature 204c, and the first location 205a of the first set of data 203a, the second location 205b of the second set of data 203b and the third location 205c of the third set of data 203c, a template 208 is generated. The template 208 contains information such as the details pertaining to the data a user desires to have extracted from succeeding documents and the methods to locate and extract the desired data from the succeeding documents.

Furthermore, in some examples, the template 208 includes a fourth signature 204d and a fourth location 205d of data. The fourth signature 204d includes only the similarities discovered among the first signature 204a, the second signature 204b and the third signature 204c. The fourth location 205d of data includes only the similarities present among the first location 205a of the first set of data 203a, the second location 205b of the second set of data 203b and the third location 205c of the third set of data 203c. The system 100 is not limited to receiving three sample lists 201, the more samples lists 201 inputted into the system 100 by the user, the more efficient the methods within the templates 208 for locating and extracting the desired data will be.

Figure 2B:
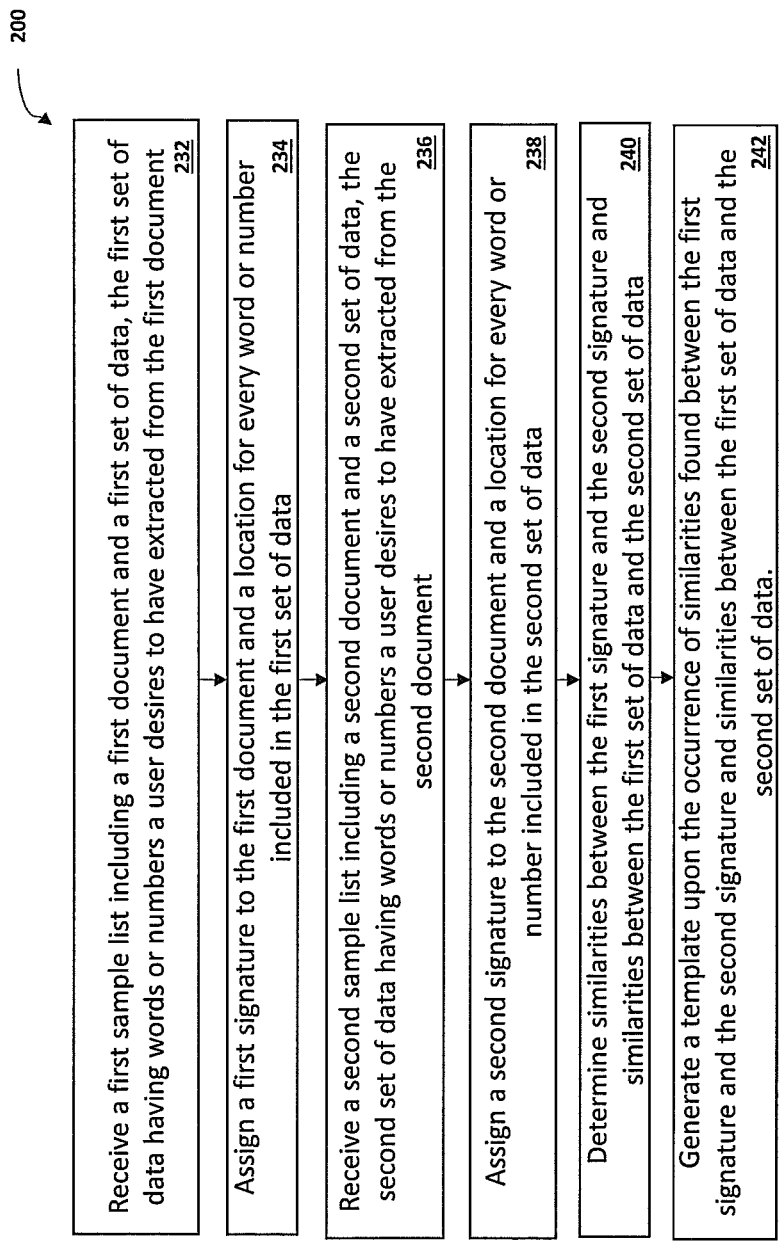
FIG. 2B is a flow diagram of the example template generation method depicted in FIG. 2A.

Referring to FIG. 2B, a method 200 for creating a template 208 for extracting data from a document is illustrated. In some examples, the method 200 may be carried out by the computing device 101 of system 100, whereby the computing device 101 executes instructions stored in the computer-readable medium 110. In some examples, the method 200 may be carried out by a software application implemented on or accessed by the system 100. As used herein, a software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

At block 232, the method 200 includes receiving, at a document input module 112, a first sample list 201a, the first sample list 201a including a first document 202a and a first set of data 203a a user desires to have extracted from the first document 202a. In some examples, the instance step is the initial phase in the template 208 generation process, whereby the user is training the system 100 on the type of document the user desires to have data extracted from and the location of the data within the document the user desires to have extracted.

FIG. 2C depicts an example first document 202a that may be inputted into the system 100. In some configurations, the first sample list 201a including the first document 202a and the first set of data 203a are inputted into the system 100 in a text format. The first document 202a may be a bank or financial statement, an insurance document, a real estate document, a medical document or a HR document, etc., and may be in a semi-structured format. A semi-structured format includes both structured and unstructured elements. Structured elements include information that appears in substantially similar locations on all alike documents. For example, banking documents from Bank X may display Bank X's address in the same location on all of the documents generated for clients. In addition to the structured elements, the semi-structured format may also include unstructured elements. Unstructured elements include information that varies from document to document or information that may not appear on all documents. For example, a monthly checking account summary reflecting client A's account activity will contain different information then a monthly checking account summary reflecting client B's account activity, since client A and client B are unlikely to have identical account activity.

In some examples, banking or financial statements from corporations, large companies, well recognized banks, etc. may be more structured compared with documents from small business owners. Therefore, in some occurrences, more structured documents may be processed by the system 100 in a slightly different fashion than less structured documents. In FIG. 2C, a semi-structured banking statement illustrating a customer's checking account summary is shown.

Now referring to FIG. 2D, an example first set of data 203a is shown. The first set of data 203a is inputted into the system 100 by the user in conjunction with the first document 202a. The first set of data 203a includes the data the user desires to have extracted from the first document 202a. In some examples, the first set of data may include names, text and numerical values a user desires to have extracted from the bank or financial statement. The first set of data 203a includes only the words or numbers the users desires to have extracted from the first document 202a.

Accordingly, FIG. 2D portrays the first set of data 203a the user desires to have extracted from the first document 202a shown in FIG. 2C. The first set of data 203a includes the title of the data desired to be extract (shown in the left column) and the actual word or number desired to be extracted (shown in the right column). For example, the user may want to extract the month, year, account number, customer name, ending balance, etc. from the applicable bank statement.

Referring again to FIG. 2B, at block 234, the method 200 includes assigning, by a locating module 113, a first signature 204a to the first document 202a, and a location 205 for every word or number included in the first set of data 203a.

In some configurations, the first signature 204a includes a location for every word and number within the first document 202a.

In some examples, the locating module 113 determines the location of the words and numbers that comprise the first signature 204a and the first set of data 203a by means of absolute or relative positioning. Absolute position typically includes the use of anchors to define a location, an anchors may be from the top/bottom of a page, from the top/bottom of a line or from the left or right of a word. Whereas, relative positioning defines a location for a word or number in proximity to another word or number in the same line or in nearby line. Optical character recognition (OCR) is not utilized to determine the location of the words and numbers that comprise the first signature 204a or the first set of data 203a.

In FIG. 2E an example first signature 204a of the first document 202a is shown. In some implementations, the first signature 204a includes at least one location for every word or number included in the first document 202a. An example of an exact location is Exact word "November"; page 1; line 1; word 1. Furthermore, an example of a relative location is 1 word(s) to the right from word "through" found: page 1: line 1; word 4. In some examples, the first signature 204a includes both exact and relative locations for every word or number included in the first document 202a. Moreover, every word or number included in the first document 202a may have multiple exact and relative locations. Therefore, depending on the size of the first document 202a, the first signature 204a can be quite large. For illustrative purposes only, a simplified and reduced first signature 204a assigned to the first document 202a in FIG. 2C is shown.

Referring again to FIG. 2B, at block 236, the method 200 includes receiving, at the document input module 112, a second sample list 201b, the second sample list 201b including a second document 202b and a second set of data 203b a user desires to have extracted from the second document 202b.

Figure 2F:
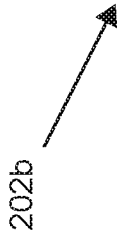
FIG. 2F is an example second document that may be inputted into the system of FIG. 1.

Now referring to FIG. 2F, an example second document 202b that may be inputted into the system 100 is presented. The second sample list 201b including the second document 202b and the second set of data 203b are inputted into the system 100 in a text format. In this instance, the second document 202b is a simple banking statement illustrating a customer's checking account summary, similar to the first document 202a in FIG. 2C. The second document 202b may be in a semi-structured format.

In FIG. 2G an example second set of data 203b is shown. The second set of data 203b is inputted into the system 100 by the user in conjunction with the second document 202b. The second set of data 204b includes the data the user desires to have extracted from the second document 202b. In some examples, the second set of data may include names, text and numerical values a user desires to have extracted from the bank or financial statement. Furthermore, the second set of data 203b includes only the words or numbers the users desires to have extracted from the second document 202b.

Accordingly, FIG. 2G portrays the second set of data 203b the user desires to have extracted from the second document 202b shown in FIG. 2E. The second set of data 203b includes the title of the data desired to be extracted (shown in the left column) and the actual word or number desired to be extracted (shown in the right column). For example, the user may want to extract the month, year, account number, customer name, ending balance, etc. from the applicable bank statement.

Referring again to FIG. 2B, at block 238, the method 200 includes assigning, by a locating module 113, a second signature 204b to the second document 202b, and a location 205 for every word or number included in the second set of data 203b. In some configurations, the second signature 204b includes a location for every word and number within the second document 202b. The locating module 113 determines the location of the words and numbers that comprise the second signature 204b and the second set of data 203b by means of absolute or relative positioning. Optical character recognition (OCR) is not utilized to determine the location of the words and numbers that comprise the second signature 204b or the second set of data 203b.

In FIG. 2H an example second signature 204b of the second document 202b is shown. In some implementations, the second signature 204b includes at least one location for every word or number included in the second document 202b. An example of an exact location is Exact word "November"; page 1; line 1; word 1. Furthermore, an example of a relative location is 1 word(s) to the right from word "through" found: page 1: line 1; word 4. In some examples, the second signature 204b includes both exact and relative locations for every word or number included in the second document 202b. Moreover, every word or number included in the second document 202b may have multiple exact and relative locations. Therefore, depending on the size of the second document 202b, the second signature 204b can be quite large. For illustrative purposes only, a simplified and reduced second signature 204b assigned to the second document 202b in FIG. 2F is shown.

Referring again to FIG. 2B, at block 240, the method 200 includes determining, by a training module 114, similarities between the first signature 204a and the second signature 204b and similarities between the first set of data 203a and the second set of data 203b.

At block 242, the method 200 includes generating, by a template module 115, a template 208 upon the occurrence of similarities discovered between the first signature 204a and the second signature 204b, and similarities between the first set of data 203a and the second set of data 203b. The number of different templates capable of being generated is unlimited. There could be many templates for each different financial institution, company, application, etc. In some configurations, the template 208 contains information such as the details pertaining to the data a user desires to have extracted from succeeding documents and the methods to locate and extract the desired data from the succeeding documents.

In FIG. 2I an example template 208 is shown. In some examples, the template 208 includes a third signature 204 (shown in the left column) and a third location 205 of data (shown in the right column). The third signature 204 includes only the similarities discovered between the first signature 204a and the second signature 204b. The third location 205 of data includes only the similarities present between the first location 205a of the first set of data 203a and the second location 205b of the second set of data 203b.

In some configurations, the template 208 includes only the locations that are existing in both the first signature 204a and the second signature 204b, therefore the size of the template 208 is smaller than that of either the first signature 204a or the second signature 204b.

Further, there is no limit to the number of sample lists 201 a user can input into the system 100 to create a template 208. The more samples lists 201 inputted into the system 100 by the user, the more efficient the methods within the templates 208 for locating and extracting the desired data will be. In some examples, inputting 2 to 100 sample lists 201 into the system 100 is sufficient. In some configurations, inputting 2 to 1000 sample lists 201 into the system 100 is appropriate. In some implementations, inputting more than 1000 sample lists 201 is required.

Figure 3A:
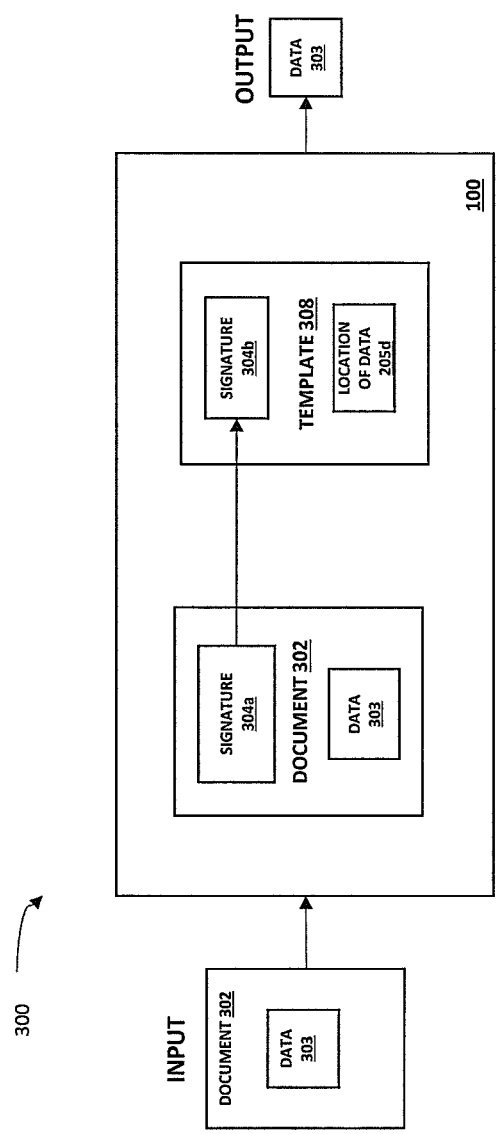
FIG. 3A is a schematic depiction of an example data extraction method.
Figure 3B:
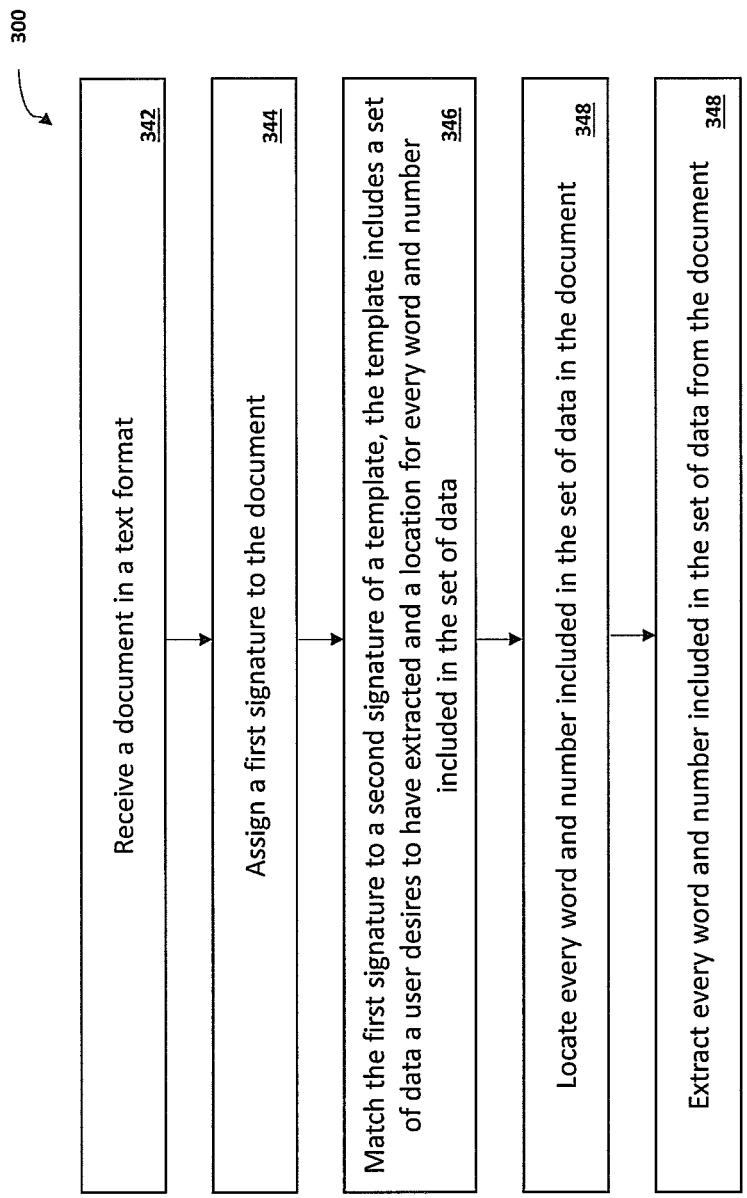
FIG. 3B is a flow diagram of the example data extraction method depicted in FIG. 3A.

FIGS. 3A and 3B illustrate a method 300 for extracting data from a document. In some examples, the method 300 may be carried out by the computing device 101 of the system 100, whereby the computing device 101 executes instructions stored in the computer readable medium 110.

At block 342, the method 300 includes receiving, at a document input module 112, a document 302 in a text format. The document 302 contains a set of data 303 that a user desires to have extracted. In some configurations, the document 302 may be a bank or financial statement, an insurance document, a real estate document, a medical document or an HR document, etc. In some examples, the document 302 may be in a semi-structured format.

At block 344, the method 300 includes assigning, by a locating module 113, a first signature 304a to the document 302. The first signature 304a includes a location for every word and number within the first document 302. The locating module 113 determines the location of the words and numbers that comprise the first signature 304a by means of absolute or relative positioning. Additionally, optical character recognition (OCR) is not utilized to determine the location of the words and numbers that comprise the first signature 304a.

At block 346, the method 300 includes matching, by a training module 114, the first signature 304a to a second signature 304b of a template 308, wherein the template 308 includes a location 205d for every word and number included in the set of data 303. Moreover, every word and number included in the second signature 304b is existing in the first signature 304a. The second signature 304b has less words and numbers than the first signature 304b.

In some configurations, unlike the instance example, if the documents inputted into the system 100 are in a less structured format than matching signatures may not work to correctly link a document to the precise template. Therefore, the system 100 may utilize a key word frequency approach. In some examples, the key word frequency approach involves generating a distribution of the frequency of certain key words in both the inputted document and the templates. Accordingly, the system 100 determines the top key words for the inputted document and then matches the document to the template with the same top key words.

In some examples, a template match may not exist for the document inputted into the system 100. Upon this occurrence, the system 100 will began generating a new template using the document with no template match as the starting input.

At block 348, the method 300 includes extracting, by an extraction module 116, every word and number included in the set of data 303 from the document 302.

In some implementations, the system 100 includes a validation or a confidence score function. This functions ensures the data located and extracted from succeeding documents is done so accurately. In some examples, the validation and confidence scores are determined based upon observed data types, lengths, min/max values, number distributions, cross check with transactions, etc. of the data desired to be located and ultimately extracted. For example, if the system is attempting to locate an account number from a bank statement and if the system discovers the word 'November' in the location it thinks the account number should be, then the system will recognize this is incorrect.

Figure 4:
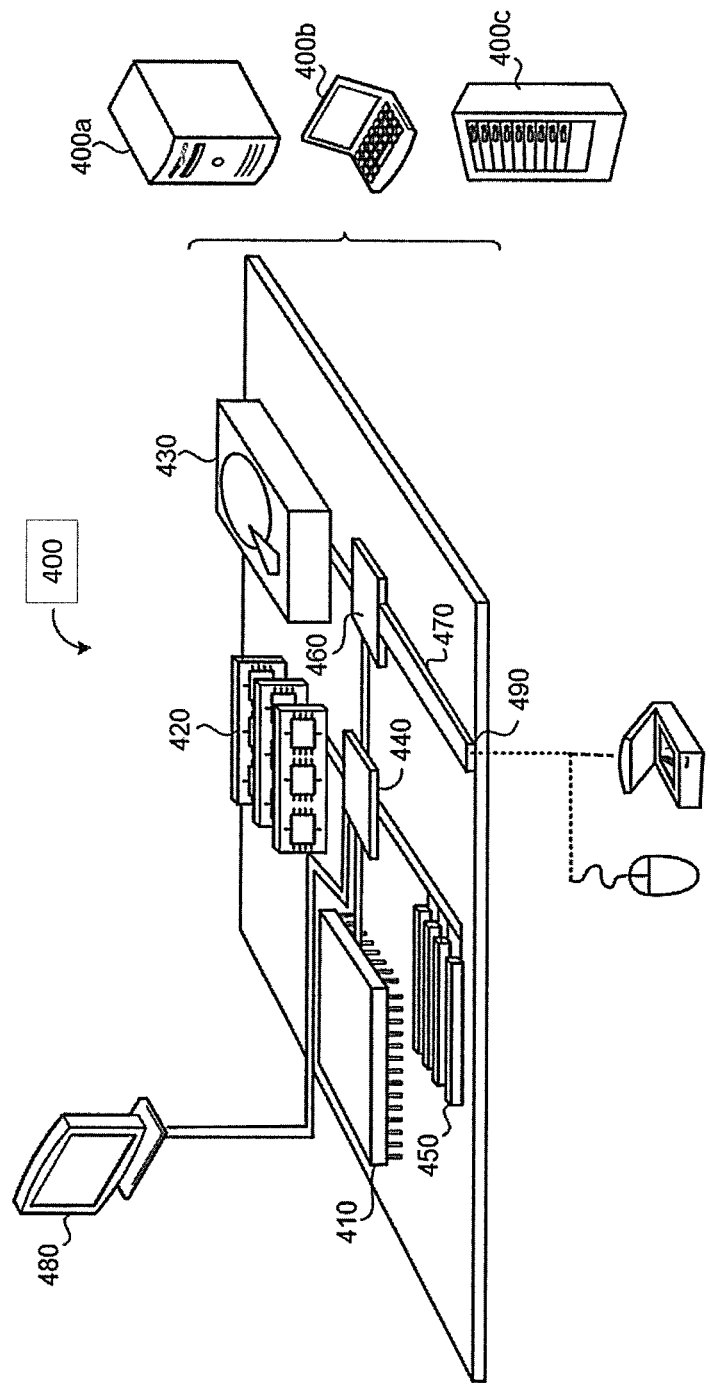
FIG. 4 is a schematic view of an example computing device that may be used to implement the systems and methods described herein.

FIG. 4 is schematic view of an example computing device 400 that may be used to implement the system 100 and methods 200, 300 described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for extracting data from a document, the method comprising:
   receiving, at a document input module, a first sample list including a first sample document and a first set of sample data, the first set of sample data having indicia a user desires to have extracted from the first sample document;
   assigning, by a locating module, a first signature to the first sample document and a location for every indicia included in the first set of sample data, wherein the location for every indicia included in the first set of sample data is determined without utilizing optical character recognition (OCR);
   receiving, at the document input module, a second sample list including a second sample document and a second set of sample data, the second set of sample data having indicia the user desires to have extracted from the second sample document;
   assigning, by the locating module, a second signature to the second sample document and a location for every indicia included in the second set of sample data, wherein the location for every indicia included in the second set of sample data is determined without utilizing optical character recognition (OCR);
   determining, by a training module, similarities between the first signature and the second signature and similarities between the first set of sample data and the second set of sample data;
   generating, by a template module, a template including a third signature based upon the determined similarities between the first signature and the second signature, and similarities between the first set of sample data and the second set of sample data;

receiving, at the document input module, an extraction document in a text format, the extraction document containing a set of extraction data that a user desires to have extracted;

assigning, by the locating module, a fourth signature to the extraction document;

matching, by the training module, the fourth signature to the third signature of the template, wherein the template includes a location for every word or number included in the set of extraction data;

locating, by the locating module, every word or number included in the set of extraction data in the extraction document without utilizing optical character recognition (OCR);

extracting, by an extraction module, every word or number included in the set of extraction data from the extraction document; and generating, at a computing device, a validation score representing an accuracy of the extracting step after not utilizing OCR to locate every word or number included in the set of extraction data in the extraction document.

2. The method of claim 1, wherein the fourth signature includes a location for every word or number within the extraction document.

3. The method of claim 1, wherein every word or number included in the fourth signature is existing in the third signature.

4. The method of claim 3, wherein the fourth signature has less words or numbers than the third signature.

5. The method of claim 1, wherein the locating module determines a location of every word or number that comprise the fourth signature and the set of extraction data by absolute or relative positioning.

6. The method of claim 5, wherein OCR is not utilized to locate the words or numbers that comprise the fourth signature and the set of extraction data.

7. A non-transitory computer-readable medium having stored thereon computer-executable instructions that, when executed by at least one processor of a computer, cause the computer to perform steps comprising:

receiving, at a document input module, a first sample list including a first sample document and a first set of sample data, the first set of sample data having indicia a user desires to have extracted from the first sample document;

assigning, by a locating module, a first signature to the first sample document and a location for every indicia included in the first set of sample data, wherein the location for every indicia included in the first set of sample data is determined without utilizing optical character recognition (OCR);

receiving, at the document input module, a second sample list including a second sample document and a second set of sample data, the second set of sample data having indicia the user desires to have extracted from the second sample document;

assigning, by the locating module, a second signature to the second sample document and a location for every indicia included in the second set of sample data, wherein the location for every indicia included in the second set of sample data is determined without utilizing optical character recognition (OCR);

determining, by a training module, similarities between the first signature and the second signature and similarities between the first set of sample data and the second set of sample data;

generating, by a template module, a template including a third signature based upon the determined similarities between the first signature and the second signature, and similarities between the first set of data and the second set of sample data, receiving, at the document input module, an extraction document in a text format, the extraction document containing a set of extraction data that a user desires to have extracted;

assigning, by the locating module, a fourth signature to the extraction document;

matching, by the training module, the fourth signature to the third signature of the template wherein the template includes a location for every word or number included in the set of extraction data;

locating, by the locating module, every word or number included in the set of extraction data in the extraction document without utilizing optical character recognition (OCR);

extracting, by an extraction module, every word or number included in the set of extraction data, wherein instructions for locating every word or number included in the set of extraction data are stored within the template; and generating a validation score representing an accuracy of the extracting step after not utilizing OCR to locate every word or number included in the set of extraction data in the extraction document.

8. The non-transitory computer-readable medium of claim 7, wherein every word or number included in the set of extraction data includes only the words and numbers the user desires to have extracted.

* * * * *